United States Patent [19]

Wright

[11] 3,971,568
[45] July 27, 1976

[54] SELF-SUPPORTING NESTING CART

[75] Inventor: Leonard E. Wright, Paradise Valley, Ariz.

[73] Assignee: Tradewind Industries, Inc., Liberal, Kans.

[22] Filed: Jan. 31, 1975

[21] Appl. No.: 546,104

[52] U.S. Cl.......................... 280/33.99 H; 280/47.35
[51] Int. Cl.²......................................... B62B 11/00
[58] Field of Search.............. 280/33.99 H, 33.99 R, 280/37.99 S, 33.99 T, 33.99 F, 33.99 A, 79.3, 79.2, 79.1, 36 R, 408, 409, 411, 47.35; 211/178 R

[56] References Cited
UNITED STATES PATENTS

| | | | |
|---|---|---|---|
| 3,191,959 | 6/1965 | Heimbruch et al. | 280/33.99 R |
| 3,240,505 | 3/1966 | Schlernitzauer | 280/79.3 |
| 3,462,166 | 8/1969 | Fuhrmann | 280/33.99 S |
| 3,608,920 | 9/1971 | Rubin | 280/33.99 T |
| 3,726,535 | 4/1973 | Longato | 280/408 |
| 3,782,746 | 1/1974 | Isaacs | 280/33.99 H |
| 3,827,376 | 8/1974 | Solomon | 280/33.99 H |
| 3,827,573 | 8/1974 | Guerette | 280/79.3 |
| 3,840,242 | 10/1974 | Craig et al. | 280/33.99 H |
| 3,840,243 | 10/1974 | Rheinhart | 280/36 R |
| 3,874,689 | 4/1975 | Morgan | 280/33.99 H |

*Primary Examiner*—M. H. Wood, Jr.
*Assistant Examiner*—David M. Mitchell
*Attorney, Agent, or Firm*—Dunlap, Codding & McCarthy

[57] ABSTRACT

An improved self-supporting nesting cart comprising a rigid end frame and a swivel end frame spatially positioned by back frame means supporting at least one folding shelf disposed between the rigid end frame and the swivel end frame, the cart having a use profile and a nesting profile. In the nesting profile, the shelf is positioned in a folded-in position and the swivel end frame is positioned in a folded position. Selectively engageable latching means retain the shelf in the folded-in position and the swivel end frame in the folded position when the cart is in the nesting profile. Catch means interconnect adjacent carts while nesting, and tow bar means permit single or plural cart transporting.

15 Claims, 10 Drawing Figures

SELF-SUPPORTING NESTING CART

BACKGROUND OF THE INVENTION

1. Field of the Invention

The present invention relates generally to material handling devices, and more particularly but not by way of limitation, to a self-supporting combination folding and nesting cart for bulk handling and shipment of commercial goods.

2. Description of the Prior Art

In the mass distribution of commercial products, the cost of handling the products in transporting systems is a very large factor in determining the pricing structure of those products. As the price of labor, energy and hauling devices has increased over the years, and especially in the last few years, there have been many developments aimed at reducing the distribution costs of materials by streamlining the flow of such materials. It is a generally conceded fact of material distribution that the price of distributing goods is greatly affected by the number of times that a product is handled, that is, the number of times a product is moved manually from the point of manufacture through warehousing and ultimate retail outlet disposal. It is known that one of the most effective means of minimizing such handling expenses is to maintain the goods insofar as possible on the same material handling pallets or carts.

Experience with trucking and other like distributing methods has taught distributors that effective cost control requires high utilization of transportation space both to and from the point of distribution. That is, the return trip of the transporting vehicle should be utilized as efficiently as possible, eliminating such needless items as the return of empty high volume carts.

While pallets are widely used in view of the economy considerations above, there are many situations in which self-supporting carts must be used in order to provide mobility for the goods, and in fact, many schemes of distribution rely entirely on self-supporting carts because of the ease and simplicity offered thereby.

Of necessity, foldable nesting carts have been developed to take advantage of the efficient stacking characteristics of pallets while providing high mobility of operation. Prior art self-supporting carts that nest for high stacking efficiency generally have had good industrial acceptance as material handling devices. By "nesting", it is meant that the carts have the capability of being spaced compactly with carts of like construction. Usually, in order to nest the carts compactly, portions of the carts fold in a manner that reduces the bulk volume of the cart.

The present invention presents a self-supporting cart that improves the nesting efficiency of the carts while maintaining strength and durability in a lightweight cart. That is, carts constructed in accordance with the present invention take up a minimum of space when nested; the carts can be moved while nested; the carts retain their stability while nested; the carts may be constructed of lightweight yet strong materials; and the carts nest easily, requiring no operator experience to nest or to remove from nesting.

Traditionally, foldable carts have been very noisy, as the component parts usually have some freedom to bounce and fret during cart movement. Noise created by such unnecessary component movement generally increases with the age of the carts. On the other hand, carts constructed in accordance with the present invention are very quiet in comparison to prior art devices, and the construction is such that noise levels are not appreciably increased with cart ageing.

BRIEF DESCRIPTION OF THE DRAWINGS

FIG. 6 is a semi-diagrammatical top view of several carts constructed in accordance with the present invention when nested together.

DESCRIPTION OF THE PREFERRED EMBODIMENT

Figure 1:
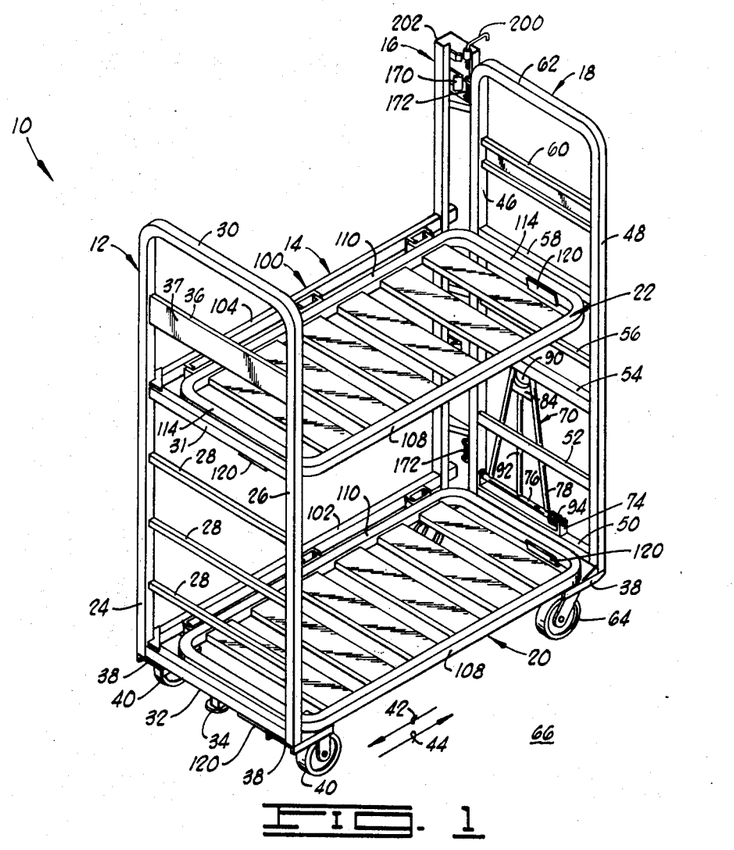
FIG. 1 is an isometric view of a cart constructed in accordance with the present invention, the cart having its shelves positioned in the folded-out position.

Referring to the drawings in general, and particularly to FIG. 1, shown therein is a self-supporting combination folding and nesting cart constructed in accordance with the present invention and designated by the numeral 10. The cart 10 in the preferred embodiment as described herein is comprised of a first end frame 12, a back frame 14, a corner post member 16, a second end frame 18, a first shelf 20 and a second shelf 22. These and the other components of the cart 10 will be described more fully below.

Figure 2:
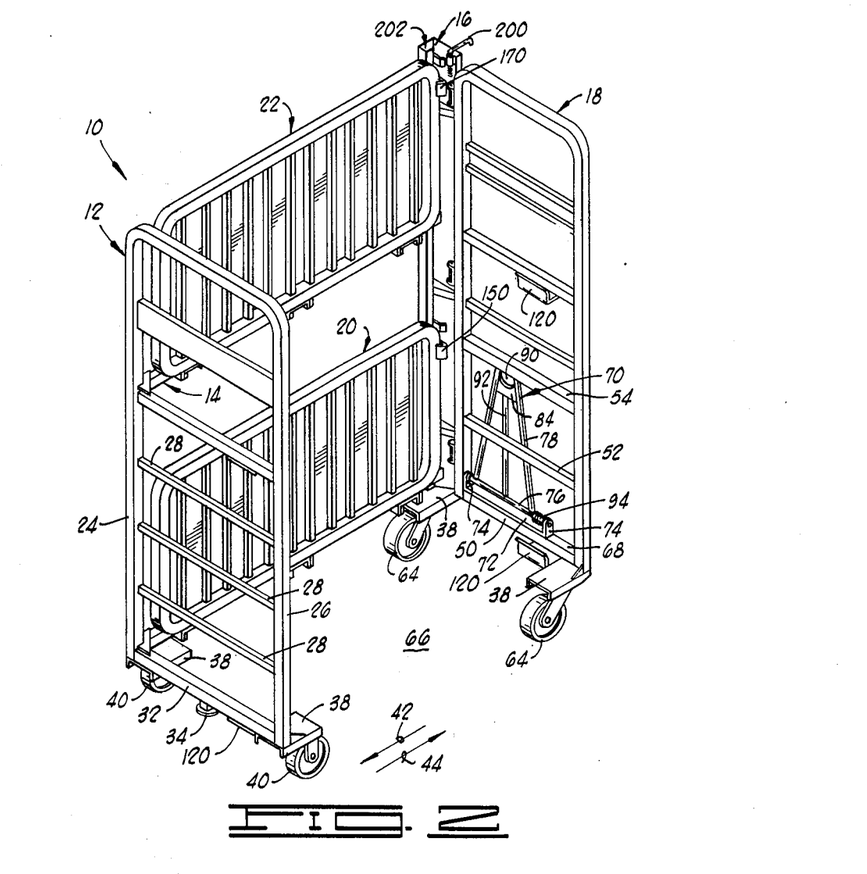
FIG. 2 is an isometric view of the cart of FIG. 1 with the shelves in the folded-in position.
Figure 3:
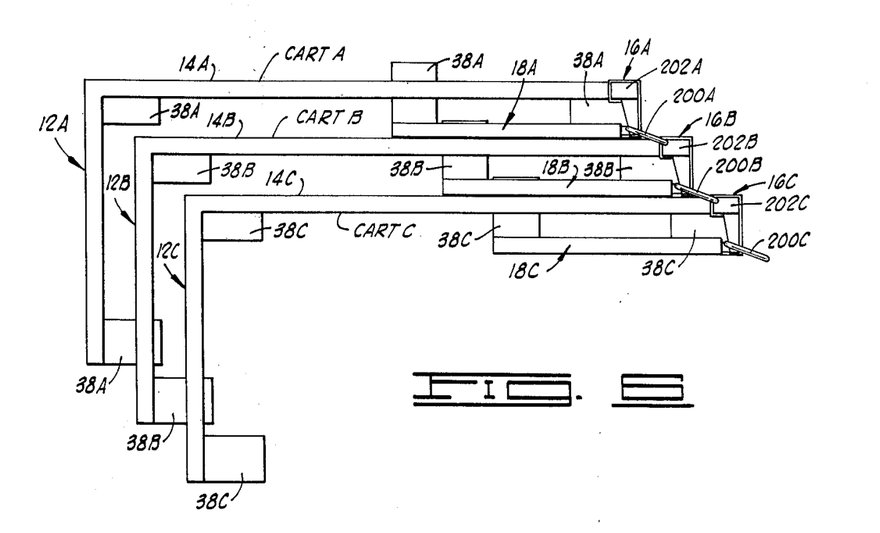
FIG. 3 is a front side elevational, semi-detailed view of the cart of FIG. 1. The broken lines in the figure indicate the positions of the shelves when in the folded-in position and the swivel end frame when in the folded position.

Prior to embarking upon a discussion of the details of the construction of the cart 10, an overview of the operation of the cart 10 will be undertaken. In FIG. 1, the shelves 20 and 22 are shown in the horizontal or folded-out position. In FIG. 2, the first and second shelves 20 and 22 are shown in the vertical or folded-in position. The second end frame 18 is hingedly connected to the corner post member 16 and as shown in diagrammatical representation in FIG. 3, the second end frame 18 pivots relative to the corner post member 16 for the purpose of facilitating nesting, a characteristic of the cart 10 that will become clear below. When the first shelf 20 and the second shelf 22 are positioned vertically, and the second end frame is folded, the cart 10 assumes a generally L-shaped profile, as viewed from its top, and the nesting of the cart 10 with similarly constructed carts is easily accomplished, the nesting requiring no skill on the part of the person performing the nesting.

Turning now to the details of construction and referring to FIG. 1, the first end frame 12, which will also be referred to herein as a rigid end frame, is constructed of a pair of vertically extending members 24 and 26 that are spaced apart by and connected with a plurality of horizontal members 28. The vertical members 24 and 26 bend and join at their tops to form an upper horizontal member 30. A horizontal member 31, somewhat larger than the members 28, is disposed between the vertical members 24 and 26 at a vertical level to be determined by the placement of the shelf 22 for a reason that will become clear below. The lower ends of the members 24 and 26 are connected by a horizontal member 32 which is somewhat larger than the members 28, the member 32 thus forming the base of a vertical planar network that comprises the first end frame 12. Located at the under side of the member 32 is a towing pin 34 that extends downwardly for the purpose of providing a towing connection point for a towing bar that will be described below.

A horizontal chalkboard member 36 is connected between the vertical members 24 and 26 near the top member 30. That is, a wider horizontal member 36 is provided having an optional chalking surface 37 on either or both sides, as is known conventionally, for providing means to identify the cart and/or its contents by impressing a desired message thereupon with chalk or the like, and which may be rapidly changed as required.

Located at the base of the first end frame 12 is a pair of planar members 38 that are connected to and extend horizontally from the lower ends of the vertical members 24 and 26 and from the lower surface of the horizontal member 32. As shown in FIG. 1, the planar members 38 have been made from flanged stock so as to provide additional strength to the planar members 38. Attached to the under side of the planar members 38 are the wheel casters 40, which are conventionally known in the art. The casters 40 may be of the type that pivot, but in the preferred form as shown in FIG. 1, the casters 40 are fixed and provide running gear that rollingly support the first end frame 12 for movement in the directions 42 or 44 as depicted by the arrows.

The second end frame 18 is similar in construction to the first end frame 12, with the exceptions that will be noted. The second end frame 18, which will also be referred to herein as a swivel end frame, is constructed of a pair of vertically extending members 46 and 48 that are spaced apart by and connected with a plurality of horizontal members 50, 52, 54, 56, 58 and 60. The horizontal members 50 and 58 are of the same weight stock as the horizontal members 31 and 32 of the rigid end frame 12 previously described. The horizontal member 52 is a relatively thin member for a purpose that will become clear with the discussion of the tow bar included below. The horizontal member 56 is of the same size as the horizontal members 28 of the rigid frame 12. The member 60 is a chalkboard that is similar in construction to the previously described chalkboard member 36, the chalkboard 60 being disposed between the members 46 and 48 at approximately the same height vertically as the chalkboard member 36 and serving the same purpose as does the chalkboard member 36. The vertical members 46 and 48 bend and join at their tops to form an upper horizontal member 62. The horizontal member 58 spans the vertical members 46 and 48 at the same level as that of the horizontal member 31, the height of which is determined by the placement of the shelf 22 in its folded-out position. The lower horizontal member 50, joining the vertical members 46 and 48 at the lower ends thereof, forms the base of the vertical planar network that comprises the second end frame 18.

Located at the base of the second end frame 18 is a planar member 38 that is connected to and extends horizontally from the lower end of the vertical member 48 in the same manner and for the same purpose as described for the first end frame 12. Attached to the under side of the planar member 38 is the swivel wheel caster 64, the caster 64 being conventional in the art. The caster 64 may be of the rigid variety as described for the fixed caster 40, but in the preferred form as described herein, the caster 64 is rotatable about an axis that is perpendicular to the support surface 66 upon which the cart 10 is supported. Although a discussion of the corner post member 16 is reserved for a full discussion thereof until later below, it should be noted that another planar member 38 and an attached swivel caster 64 is connected to the base of the corner post member 16. These two swivel casters 64 that support the swivel end frame 18 and the corner post member 16 are identical, and such casters are well known and commercially available. The means of attachment of the casters 40 and 64 is not considered essential to the present invention, and any convenient method may be employed, such as welding or bolting.

Figure 4:
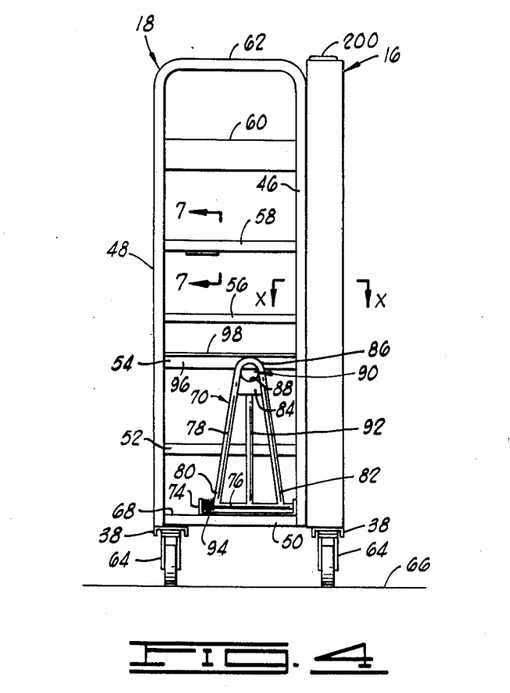
FIG. 4 is an end elevational view of the cart of FIG. 1 showing the swivel end frame positioned in the extended position.

Supported on the upper surface 68 of the lower horizontal member 50 of the second end frame 18 is the tow bar assembly 70 as may be viewed in FIGS. 2 and 4. The tow bar assembly 70 is constructed of a base member 72 that is secured to the top surface 68 of the horizontal member 50. The base member 72 has at each of its ends an up-turned ear 74 through which are disposed axially aligned apertures that bearingly and retainingly receive an axle member 76. Connected to the axle 76 is a V-shaped bar 78 that is connected to the axle 76 at the ends 80 and 82 of the bar 78. A plate 84 is welded across the bar 78 near the apex 86 and has a shaped edge 88 that forms with the apex of the bar 78 a hooking aperture 90. For reinforcement purposes, a support bar 92 is connected between the plate 84 at the approximate midpoint of the axle 76. The axle 76 is rotatable in the support apertures of the ears 74, and it follows that the tow bar 78 is positionable in the position that is shown in FIGS. 2 and 4, or it may assume an extended position by the rotation thereof with the axle 76. In order to retain the tow bar 78 in the retracted or vertical position shown in the figures, a coiled spring 94 is provided about the axle 76 and in conventional manner has one end connected to the base member 72 and its other end attached to the tow bar 78 so as to bias the tow bar to be positioned in the vertical or retracted position. It will be recognized that as the tow bar 78 rotates in a direction that causes the tow bar 78 to move away from the vertical position, the spring 94 will be torsioned, thereby providing a force to urge the tow bar 78 to return to its vertical position. The hooking aperture 90 is dimensioned to be engageable with the towing pin 34 of a cart that is constructed in like manner to the cart 10. That is, when carts of like construction to the cart 10 are placed in tandem relationship, the tow bar 78 of one cart 10 is hookingly engageable with the towing pin 34 of another cart 10. In this manner, a train of carts constructed in accordance with the invention herein may be made up for purposes of pulling a number of the carts with the same towing vehicle.

In order to dispose the towing bar 70 largely within the confines of the swivel end frame 18, the horizontal member 52 is made somewhat thinner than the thickness of the vertical members 46 and 48, and the horizontal member 54 is fashioned of angle iron stock, as shown in FIG. 4, so that the apex 86 of the tow bar 78 butts up against the lower flange 96 and under the upper flange 98 of the horizontal member 54. It will be understood that the towing bar assembly 70 could as well be mounted on the fixed end frame 12 in the manner similar to that described for the mounting thereof on the swivel end frame 18.

Turning now to a discussion of the other components of the cart 10, generally disposed between the first and second end frames 12 and 18 is a shelf assembly 100 that is comprised of a back frame portion 14, a corner post member 16, a first shelf 20, a second shelf 22, and other components that will be described below. FIGS. 1 through 4 will provide general perspective to the following discussion, while the details of construction are more particularly pointed out by referring to the FIGS. 5 through 10.

Figure 9:
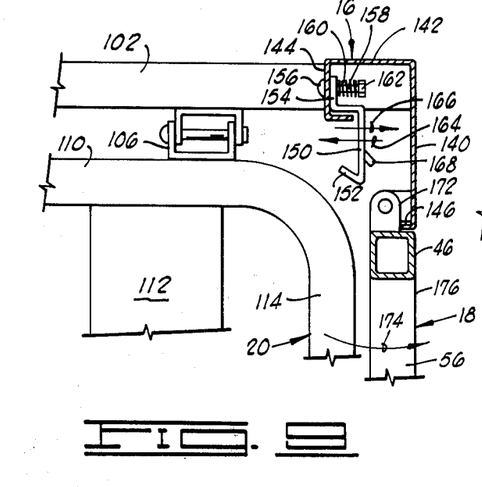
FIG. 9 is a cross-sectional view taken at X—X in FIG. 4 with the mid-shelf positioned in the folded-out position and the swivel end frame in the extended position.

The corner post 16 is a formed elongate member that is established vertically and generally parallel to the vertical network of the first frame 12 by disposing therebetween the back frame portion 14. In the preferred form of construction as shown in the figures, the back frame portion 14 comprises a lower cross member 102 and an upper cross member 104 that are connected to the vertical member 24 and which extend generally horizontally to where they connect with the corner post member 16 in a manner that will be described presently. The lower cross member 102 hingedly supports the first shelf 20, and the upper cross member 104 hingedly supports the second shelf 22. A view of one of the hinges utilized to connect the first and second shelves 20 and 22 to the cross members 102 and 104 is viewable in the cross-sectional view shown in FIG. 9. The hinge 106 shown in FIG. 9 is conventional and need not be described in detail in the present disclosure. It is sufficient to state that several of the hinges 106 are connected between the first and second shelves 20 and 22 and the cross members 102 and 104 in a manner that permits the shelves to assume a vertical or folded-in position as shown in FIG. 2, or alternatively to assume a horizontal or folded-out position as shown in FIG. 1.

Figure 5:
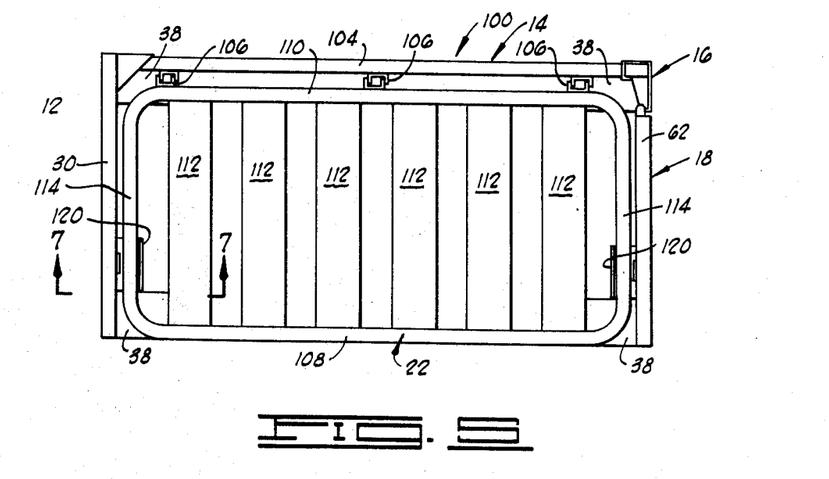
FIG. 5 is a top plan view of the cart of FIG. 1 showing the shelf in the folded-out position and the swivel end frame extended.

The shelves 20 and 22 are identical in construction, and for purposes of the disclosure herein, it will be sufficient to describe the shelf 22 as shown in the top plan view of FIG. 5. The shelf 22 comprises a pair of parallel and spaced apart elongated members 108 and 110 that are spaced apart by and connected to a plurality of parallel and generally planar members 112. The ends of the members 108 and 110 bend and join to form the end members 114 such that the members 108, 110 and 114 join to form a generally rectangular peripheral member with the spaced apart planar members 112 spanning therebetween. As shown in FIG. 5, the shelf 22 is connected to the upper cross member 104 by the hinges 106. By referring to FIGS. 1 and 2 once again, the support of the shelves 20 and 22 will become clear. While the planar members 112 have been shown as spanning between the elongated members 108 and 110, it will be understood that this shelf construction does not limit the present invention, as other designs may as well be used, such as using planar members spanning between the opposing end members 114, or using solid shelf construction for the shelves 20 and 22.

The upper cross member 104 is generally the same size as the horizontal members 31 and 58, respectively of the first end frame 12 and the second end frame 18, and the upper cross member 104 is established at approximately the same vertical level as the members 31 and 58. Therefore, when the shelf 22 is in the horizontal or folded-out position depicted in FIG. 1, the shelf 22 is at the approximate level of the members 31 and 58, as may best be viewed by referring to FIG. 7 which is a cross-sectional view taken at 7—7 in FIG. 5.

Figure 7:
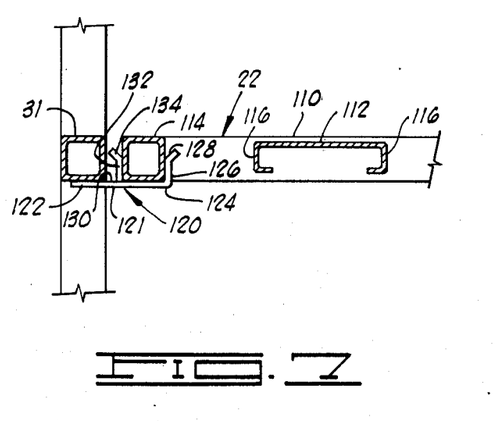
FIG. 7 is a cross-sectional view taken at 7—7 in FIG. 4.

FIG. 7 shows a cross-sectional view of one of the shelf members 112 and indicates the roll under flanges 116 that are suggested to provide additional strength to the shelf member 112 while permitting the use of relatively thin gauge material to fabricate the shelf members 112. FIG. 7 also indicates the relative positions of the horizontal member 31 and the shelf 22 when the shelf 22 is in the horizontal or folded-out position as depicted in FIG. 1. Attached to the under side of the horizontal member 31 is a shelf supporting latch 120 that provides supporting and latching means for selectively supporting and retaining the shelf 22 in the folded-out position. Attached to the under side of the horizontal member 58 is an identical shelf supporting latch 120, and another identical latch 120 is attached to the under side of each of the horizontal base members 32 and 50 respectively of the first and second end frames 12 and 18. As the shelf supporting latches 120 are identical in construction, it will be sufficient for the purposes of the present disclosure to describe in detail the construction and operation of the shelf supporting latch 120 as depicted in FIG. 7. The shelf supporting latch 120 is comprised of a base plate 121 that is attached along its end 122 to the under side of the horizontal member 31. The distal edge 124 is rolled upward to form a flange 126 that is flared at its upper edge 128. Attached to the upper surface 130 of the plate 121 and normal thereto is a spring tab 132 that has a flared upper edge 134. The distance between the flange 126 and the spring tab 132, and the cross-sectional dimension of the member 114 of the shelf 22 are predetermined and established such that the member 114 is grippingly retained by the tension of the flange 126 and the spring tab 132 exerted upon the sides thereof. The construction of the shelf supporting latch 120 is designed to support the shelf 22 via the support surface 130 thereof and to retain the member 114 via the operation of the clamping pressures exerted thereon by the flange 126 and the spring tab 132.

In like manner, the shelf 22 is supported by the shelf supporting latch 120 at the other end of the shelf 22 as shown in FIG. 1. Also, the first shelf 20, which is the lower shelf, is supported by the shelf supporting latches 120 attached to the under side of the horizontal base members 50 and 32. The shelf supporting latches 120 are positioned as shown in order to prevent the first shelf 20 from bouncing or in otherwise moving upward except as when desired. The shelf supporting latches 120, while providing support to the shelves 20 and 22, also reduce the noise of the cart 10 by the firm and positive placement of the shelves 20 and 22 when placed in the folded-out position. It will be recognized that the only requirement to raise the shelves 20 and 22 to the vertical or folded-in position is to simply exert enough force, which can be done manually, to the shelves 20 and 22 to unseat them from the shelf supporting latches 120, and then to simply rotate the shelves 20 and 22 about the hinges 106 until the shelves reach the vertical position.

While the shelf 22 has been described in detail in its construction and operation techniques, it has heretofore been stated that the shelf 20 is identical in construction to the shelf 22, and further description of the construction and operation of the shelf 20 will not be necessary to fulfill the purposes of this disclosure.

Figure 10:
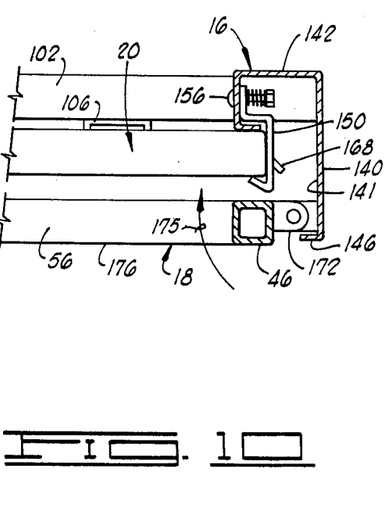
FIG. 10 is a cross-sectional view taken at X—X in FIG. 4 with the mid-shelf in the folded-in position and with the swivel end frame in the folded position.

Returning to a description of the corner post member 16, the cross-sectional views of FIGS. 9 and 10, as taken at X—X in FIG. 4, show the formed profile of the corner post member 16 with clarity. The corner post member 16 is formed to have a generally L-shaped cross-section, having a flat portion 140, another flat portion 142, a rolled flange 144, and a flange 146. Appropriately sized apertures are disposed in the rolled flange 144 to accept the ends of the upper and lower horizontal cross members 102 and 104 therethrough, thereby strengthening the connecting joint between the corner post member 16 and the horizontal cross members 102 and 104. Of course, it is anticipated that welding or other means of attaching the horizontal cross members 102 and 104 will be utilized to rigidly secure the cross members 102 and 104 to the corner post member 16.

Supported by the corner post member 16 and positioned to engage and retain the first shelf 20 in the vertical position, is a slam latch 150, the details of which are more clearly viewed by reference to FIGS. 9 and 10. The latch 150 is constructed to have a hook portion 152 and a base portion 154; the base portion 154 is secured within the hollow of the corner post member 16 and attached to the side surface of the roll around flange 144 by means of a guide member 156. The guide member 156 is secured to the flange 144 and has a supporting rod 158 that slidingly retains the base 154 of the latch 150 by means of an appropriately sized aperture therein. A spring 160 is disposed between the base 154 and a nut 162, the nut 162 being threadedly engaged with the threaded end of the slide rod 158. The spring 158 biases the latch to move in the direction 164. The latch 150 is disposed to engage the first shelf 20 when the shelf 20 is in the vertical position as shown in FIG. 2. The movement of the shelf 20 against the hook portion 152 causes the latch 150 to move in the direction 166 until the contacting member 114 of the shelf 20 has moved past the hook portion 152, whereupon the spring 160 causes the latch 150 to move in the direction 164 to bring the hook 152 into hooking engagement with the shelf 20 as shown in FIG. 10. A lifting tab 168 is provided so that by the manipulation of finger pressure thereto, the latch 150 can be moved in the direction 166 in order to release the shelf 20 from its retained vertical position.

The provision of the slam latch 150 permits the easy and quick retention of the shelf 20 in the vertical position by simply forcefully rotating the shelf 20 toward its vertical position, and upon reaching that position, the shelf 20 will remain in that position until selectively released therefrom by the application of finger pressure to release the latch 150. As will be noted in FIGS. 1 and 2, a slam latch 170, identical in construction to the slam latch 150, is provided near the upper end of the corner post member 16 to function upon the second shelf 22 in the same manner and for the same purpose as the slam latch 150 functions upon the first shelf 20, that is, for the selective retention of the second shelf 22 in the vertical position as shown in FIG. 2.

The details of the hinged connection of the swivel end frame 18 to the corner post member 16 may be viewed by reference to FIGS. 9 and 10. The vertical member 46 of the swivel end frame 18 is connected to the inner surface 141 of the flat portion 140 of the corner post member 16 by the hinges 172. The hinges 172 are conventional hinges which are commercially available, and the details of hinges 172 will not be described further herein. It is sufficient to say that the hinges are selected to permit the pivoting of the swivel end frame 18 relative to the corner post member 16, and the flange 146 is dimensioned to bear against the hinges 172 in order to restrict the rotation of the swivel end frame 18 beyond that which is shown in FIG. 9. That is, when the swivel end gate 18 is rotated in the rotational direction 174, the dimensions of the hinge 172 and the flange 146 are determined to provide stopping means whereby the edge 176 is approximately aligned with the flat portion 140 of the corner post member 16. When the swivel end frame 18 is in the extended position as shown in FIG. 9, the swivel end frame 18 is rigidly secured thereat by the operation of the self-supporting latches 120 and 122 that secure the swivel end frame 18 to the folded-out shelves 20 and 22 in the manner described above. On the other hand, when the shelves 20 and 22 are positioned in the vertical or folded-in position as depicted in FIG. 2, the swivel end frame is rotatable in the direction 175 to a folded position that is shown in FIG. 10, and which is also depicted by the broken lines of the diagrammatical view of FIG. 3. In order to provide means to secure the swivel end frame 18 in the folded position of FIG. 10, a slam latch 180 is provided at the under side of the upper horizontal member 104 as most clearly viewed in FIG. 8, which is a cross-sectional view taken at 8—8 in FIG. 3. The latch 180 is similar in construction to the latch 150 described previously, and it will be necessary only to provide a brief description of its construction and operation. The latch 180 has a hook portion 182 and a guided base portion 184 that is slidingly engaged with a rod 186 that is attached to a protruding ear platform 188 attached to and extensive from the horizontal cross member 104. A coil spring 190 urges the latch in an upward direction.

While the corner post member 16 has been described as a formed member, it will be understood that this is merely a suggested mode of construction. Further, it is suggested that the corner post member 16 be enclosed by bridging via a panel member the gap between the flange 144 and flange 146, with appropriately spaced and sized cutouts provided for the hinges 172. In addition, strengthener members may be added to reinforce the frame of the corner post member 16, thereby permitting the use of relatively light guage materials.

Figure 8:
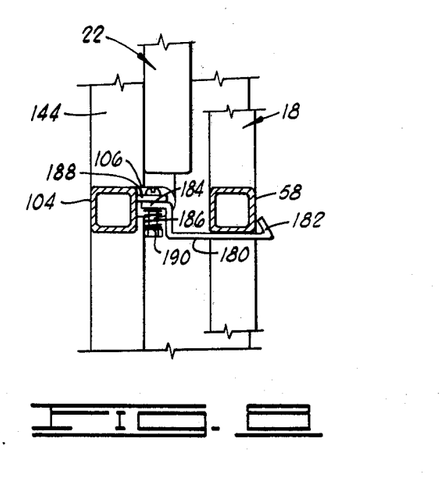
FIG. 8 is a cross-sectional view taken at 8—8 in FIG. 3 provided with the details of the latch that retains the swivel end frame in the folded position.

As will be clear when viewing FIG. 8, along with the other figures included herein, the folding feature of the cart 10 is accomplished by the rotation of the shelves 20 and 22 in the folded-up or vertical position, and by rotating the swivel end frame 18 to the folded position. The shelf members 20 and 22 are retained in the folded-up position by the slam latches 150 and 170 which are designed to be engaged by simply rotating the shelves 20 and 22 upwardly with sufficient force to cause the angled portions of the hooks 152 of the slam latches 150 and 170 to move in the direction 166 until the shelves 20 and 22 have cleared the hooked portions 152 at which time the latches 150 and 170 will move in the direction 164 by the action of the springs 160 to engage the members 114 of the shelves 20 and 22. In like manner, the swivel end frame 18 is rotated inwardly in the direction 175 with sufficient force against the slam latch 180 to cause the latch 180 to move into clearing relationship to the horizontal member 58, and once the member 58 is past the hook portion 182 of the latch 180, the latch 180 is moved by the action of the spring 190 into hooking engagement with the member 58. Consequently, the swivel end frame 18 is locked into its folded position. The swivel wheel 64 that supports the outer edge formed by the vertical member 48 permits the rotational movement of the swivel end frame 18 in the directions 174 and 175. The other swivel wheel 64, which is attached to the planar member 38 connected to the base of the corner post member 16, completes the running gear support for the cart 10, the pair of swivel casters 64 providing the cart 10 with turning mobility. It will be understood that swivel type casters could as well be used at either or both ends of the cart 10, or that all fixed type casters could be utilized in the construction of cart 10, but the preferred arrangement of fixed casters 40 and swivel casters 64 has been described herein.

With the carts 10 having the shelves 20 and 22 in the folded-in position and the swivel end frame 18 in the folded position, the cart 10 is in a nesting profile; that is, the cart 10 may be closely positioned to other carts of like construction and profile in the manner depicted by the semi-detail, diagrammatical view of FIG. 6 wherein is shown carts A, B and C. Each of the carts A, B and C are constructed as described herein above for the cart 10, and therefore the component parts of the carts A, B and C have been designated with the same numerals and provided with a designated letter with each of the numerals. The shelves 20 and 22 are not depicted in FIG. 6 in order to keep the drawing as definitive as possible of the nesting characteristics of cart 10. However, it will be clear that the shelves 20 and 22 are folded-up and against the back frame portion 14 in the nesting profile.

Each of the carts A, B and C has a generally L-shaped profile when in the nesting profile with the shelves 20 and 22 and the swivel end frame 18 folded as above described. The carts A, B and C are positionable so that the fixed end frames 12A, 12B and 12C are disposed generally in adjacent and parallel relationship to each other, and the back frames 14A, 14B and 14C (along with the folded-up shelves 20 and 22 that are not shown) are disposed generally in adjacent and parallel relationship to each other. It should be noted that the planar members 38A, 38B and 38C attached under the swivel end frame 18A, 18B and 18C pass clearingly under the back frame 14A, 14B and 14C (as well as passing under the adjacent swivel end frame adjacent next). Considering manufacturing tolerances in general, it is believed to be a good practice to inspect the carts during manufacture to ascertain that the above described clearance for the planar members 38 is achieved, and it may be a manufacturing expedient to relieve the top surface of the planar member 38 that is attached under the swivel end frame 18 to assure the clearing relation thereof with the back frame 14. Also, gusset plate strengthener members may be added to the planar members 38 as required to maintain the dimensions thereof and to assure the clearance of the planar member 38 attached under the swivel end frame 18 during the life of the cart.

It should be noted that the nesting of the carts A, B and C as shown in FIG. 6 provides very tight and efficient storage capability of carts made in accordance with the present invention. In order to stabilize the carts A, B and C during nesting, a catch means is provided to secure each cart to the adjacent cart. That is, a nesting latch 200, as shown in FIGS. 1 and 2, is pivotally mounted at the top of the corner post member 16 by means of an apertured ear lug attached to the corner post member 16. The nesting latch is generally a hook shaped member that is pivotally disposed in the aperture of the ear lug and which has connected thereto a spring means to bias the hook member downwardly while permitting the lifting of the hook member within the confines of the apertured lug. The top of the corner post member 16 has a nesting cavity 202 that is simply the hollow formed by the roll around flange 144. As shown in FIG. 6, the nesting latch 200A of cart A is lifted over and caused to seat in hooking engagement with the nesting cavity 202B of cart B. In like manner, the nesting latch 200B of cart B is hooked with the nesting cavity 202C of the cart C. In the same manner as illustrated for the carts A, B and C, as many carts as desired may be nested and attached to secure the carts together. It will be clear that the carts can be disconnected by simply lifting the nesting latch 200 that retains the particular cart. In order to use the particular cart once it is disengaged, the cart is returned to its use profile by simply disengaging the swivel end 18 from the slam latch 180 and the shelves 20 and 22 from the slam latches 150 and 170, as above described, and by rotating these members to the folded-out positions.

Carts constructed as described herein may be used with either or both shelves in the horizontal or folded-out position. Carts may be hauled singly, or plurally, by use of the tow bar assembly 70 and the tow pin 34 used to hook the carts in tandem, that is, one behind the other. Also, multiple carts may be towed while in the nested profile and hooked with each other via their nesting latches. The carts will find wide usage for hauling various materials and may be conveniently and easily nested to conserve space when being transported or stored empty.

It is clear that the self-supporting folding and nesting cart of the present invention is capable of achieving the above-stated objects. Changes may be made in numerous details and means of construction as herein described for purposes of disclosure without departing from the spirit and the scope of the claimed invention.

What is claimed is:

1. A self-supporting combination folding and nesting cart, comprising:
   a first end frame having a side portion;
   a back frame assembly comprising:
      a corner post having a nesting cavity;
      a lower cross member having one end connected to and extending normal to the side portion of the first end frame, the other end of the lower cross member connected to the corner post; and
      a mid-horizontal cross member having one end connected to and extending normal to the side portion of the first end frame, the other end of the mid-horizontal cross member connected to the corner post;
   a second end frame pivotally connected to the corner post and selectively positionable in a folded position wherein the second end frame is adjacent to the back frame assembly, and in an extended position wherein the second end frame is normal to the back frame assembly and parallel to the first end frame;

wheel means for movably supporting the first end frame, the second end frame and the back frame assembly;

a first shelf pivotally connected to the lower cross member and selectively positionable in a folded-in position wherein the first shelf is parallel to and against the back frame assembly, and in a folded-out position wherein the first shelf is normal to the first end frame, the second end frame and the back frame assembly;

a second shelf spatially removed from the first shelf and pivotally connected to the mid-horizontal cross member, the second shelf being selectively positionable in a folded-in position wherein the second shelf is parallel to and against the back frame, and in a folded-out position wherein the second shelf is normal to the first end frame, the second end frame and the back frame assembly, the cart being in an L-shaped profile when the first shelf and the second shelf are in the folded-in position and the second end frame is in the folded position;

a hook member pivotally supported by the top of the corner post member and projecting therefrom a distance determined to be hookingly engageable with the nesting cavity of another cart of like construction placed in nesting relation to the cart when both carts are in the L-shaped profile, nesting relation being defined as having the first end frames and the back frame assemblies of both carts being respectively in adjacent and parallel relationship; and spring means connected to the hook member for biasing the hook member in hooking engagement with the nesting cavity of the other cart.

2. The cart of claim 1 further comprising:
first latch means for securing the first shelf alternately in the folded-in position or in the folded-out position; and
second latch means for securing the second shelf alternately in the folded-in position or in the folded-out position.

3. The cart of claim 2 further comprising:
third latch means for selectively securing the second end frame in the folded position.

4. The cart of claim 3 further comprising:
towing means for connecting the cart to another cart of like construction to form a cart train; and
attaching means for the connecting of another cart of like construction to the cart to form a cart train.

5. The cart of claim 4 wherein:
the towing means is characterized as comprising a tow bar having a hooking portion, the tow bar pivotally connected to the second end frame and selectively positionable in a retracted position or in an extended position; and
the attaching means is characterized as comprising a tow pin connected to the first end frame and positioned to be hookingly engaged by the hooking portion of a tow bar extended from another cart of like construction to the cart.

6. The cart of claim 5 wherein the towing means is further characterized as comprising spring means for biasing the tow bar to the retracted position or retaining the tow bar coupled to the tow pin of another cart of like construction in the towing position.

7. The cart of claim 2 wherein:
the first latch means comprises a first hook member supported by the corner post and positioned to be engaged by the first shelf moving to the folded-in position, the first hook member being positionable in a shelf locking position and in a shelf release position, the first latch means further comprising spring means for biasing the first hook member to the shelf locking position; and
the second latch means comprises a second hook member supported by the corner post and positioned to be engaged by the second shelf moving to the folded-in position, the second hook member being positionable in a shelf locking position and in a shelf release position, the second latch means further comprising spring means for biasing the second hook member to the shelf locking position.

8. The cart of claim 3 wherein:
the third latch means comprises a third hook member slidingly supported by the back frame assembly and positionable to be engaged by the second end frame rotating to the folded position, the third hook member being positionable in a second end frame locking position and in a second end frame release position, the third latch means further comprising spring means for biasing the third hook member to the second end frame locking position.

9. A self-supporting combination folding and nesting cart, comprising:
a shelf assembly, comprising:
an elongated corner post member having a nesting cavity;
a back frame comprising a first cross member having two ends, one end of the first cross member connected to the corner post member, the first cross member extending normal to the corner post member;
a first shelf pivotally attached to the first cross member and pivotal to a folded-in position and to a folded-out position;
a first end frame connected to the other end of the first cross member;
a second end frame pivotally attached to the corner post member, the second end frame being pivotal to a folded position, and alternately, the second end frame being pivotal to an extended position, the cart being in a nesting profile when the second end frame is pivoted to the folded position and the first shelf is pivoted to the folded-in position, and the cart alternately being in a use profile when the second end frame is pivoted to the extended position and the first shelf is pivoted to the folded-out position;
first latching means connected to the corner post member for selectively retaining the first shelf in the folded-in position;
second latching means connected to the back frame for selectively retaining the second end frame in the folded position;
shelf supporting means for selectively supporting and retaining the first shelf in the folded-out position;
means for movably supporting the first end frame, the second end frame and the shelf assembly on a supporting surface; and
catch means for attaching the cart to a second cart of like construction placed in nesting relation to the cart, each of the carts being in the nesting profile, and nesting relation being defined as having the first end frame of the cart in adjacent and parallel relationship to the first end frame of the second cart, and the back frame of the cart in adjacent and parallel relationship to the back frame of the second cart, the catch means comprising;

a hook member pivotally supported by the top of the corner post member and projecting therefrom a distance determined to be hookingly engagable with the nesting cavity of the second cart placed in nesting relation to the cart; and spring means for biasing the hook member in hooking engagement with the nesting cavity of the second cart.

10. The cart of claim 9 wherein:

the shelf assembly is further characterized as comprising:

a second cross member generally parallel to and spatially removed from the first cross member, the second cross member connected to the corner post member and the first end frame; and a second shelf pivotally attached to the second cross member and pivotal to a folded-in position and to a folded-out position, wherein the cart is in a nesting profile when the first and second shelves are pivoted to the folded-in positions and the second end frame is pivoted to the folded position;

the first latching means further comprises means for selectively retaining the second shelf in the folded-in position; and the shelf supporting means further comprises means selectively supporting and retaining the second shelf in the folded-out position.

11. The cart of claim 10 further comprising:

towing means for connecting the cart in tandem to another cart of like construction.

12. The cart of claim 11 wherein the towing means comprises:

a tow bar pivotally connected to the second end frame, the tow bar having a hooking portion and pivotal to retracted position and to an extended position;

spring means for biasing the tow bar to the retracted position; and a tow pin supported by the first end frame and positioned to be hookingly engaged by the hooking portion of a tow bar extended from another cart of like construction to the cart.

13. A self-supporting combination folding and nesting cart, comprising:

a vertical fixed end frame;

a vertical corner post member having a nesting cavity;

a first horizontal cross member connected to and extending between the fixed end frame and the corner post member;

a second horizontal cross member connected to and extending between the fixed end frame and the corner post member, the second horizontal cross member spatially removed a predetermined distance from the first horizontal cross member;

a vertical swivel end frame pivotally supported by the corner post member and selectively rotatable to a folded position wherein the swivel end frame is parallel to the first horizontal cross member, and to an extended position wherein the swivel end frame is parallel to the fixed end frame;

a first shelf hingedly supported by the first horizontal cross member and rotatable to a horizontal position and to a vertical position;

first shelf latching means connected to the corner post member for selectively retaining the first shelf in the vertical position;

first shelf connecting means for connecting the first shelf to the fixed end frame and the swivel end frame when the swivel end frame is in the extended position and the first shelf is in the horizontal position;

a second shelf hingedly supported by the second horizontal cross member and rotatable to a horizontal position and to a vertical position;

second shelf latching means for selectively retaining the second shelf in the vertical position; and second shelf connecting means for connecting the second shelf to the fixed end frame and to the swivel end frame when the swivel end frame is in the extended position and the second shelf is in the horizontal position;

swivel end frame latching means for selectively retaining the swivel end frame when the swivel end frame is in the folded position and when the first shelf and the second shelf are in the vertical position;

wheel means for rollingly supporting the fixed end frame and the swivel end frame on a support surface; and catch means for attaching the cart to another cart of like construction placed in nesting relation to the cart, nesting relation defined as being the condition of having the first and second shelves of each cart in the vertical position, the swivel end frame of each cart in the folded position, and wherein the fixed end frame of the cart is in adjacent and parallel relationship to the fixed end frame of the other cart, and the first and second horizontal cross members of the cart are in adjacent and parallel relationship to the first and second horizontal cross members of the other cart, the catch means comprising:

a hook member pivotally supported by the top of the corner post member and projecting therefrom a distance determined to be hookingly engagable with the nesting cavity of the other cart placed in nesting relation to the cart; and spring means for biasing the hook member in hooking engagement with the nesting cavity.

14. The cart of claim 13 further comprising:

towing means for connecting the cart in tandem relationship to another cart of like construction.

15. The cart of claim 14 wherein the towing means further comprises:

a tow bar pivotally connected to the second end frame, the tow bar having a hooking portion and pivotal to retracted position and to an extended position;

spring means for biasing the tow bar to the retracted position; and a tow pin supported by the first end frame and positioned to be hookingly engaged by the hooking portion of a tow bar extended from another cart of like construction to the cart.

* * * * *